1

United States Patent
Tseng

(10) Patent No.: US 8,064,460 B2
(45) Date of Patent: Nov. 22, 2011

(54) METHOD AND APPARATUS OF DELIVERING PROTOCOL DATA UNITS FOR A USER EQUIPMENT IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 254 days.

(21) Appl. No.: 12/116,207

(22) Filed: May 7, 2008

(65) Prior Publication Data

US 2008/0279193 A1    Nov. 13, 2008

Related U.S. Application Data

(60) Provisional application No. 60/916,546, filed on May 7, 2007.

(51) Int. Cl.
*H04L 12/28* (2006.01)
*H04L 12/56* (2006.01)

(52) U.S. Cl. .................. 370/394; 370/389; 370/392

(58) Field of Classification Search ............... 370/394, 370/389, 392
See application file for complete search history.

(56) References Cited

U.S. PATENT DOCUMENTS

| 6,781,992 B1 * | 8/2004 | Rana et al. ............ 370/394 |
| 2003/0035440 A1 | 2/2003 | Casaccia |
| 2007/0242686 A1 | 10/2007 | Zegers |
| 2008/0186946 A1 * | 8/2008 | Marinier et al. ............ 370/349 |
| 2008/0188224 A1 | 8/2008 | Pani |
| 2008/0192687 A1 | 8/2008 | Kuo |
| 2008/0219195 A1 | 9/2008 | Pani |
| 2008/0225765 A1 | 9/2008 | Marinier |
| 2008/0225893 A1 | 9/2008 | Cave |
| 2008/0227442 A1 | 9/2008 | Pani |

FOREIGN PATENT DOCUMENTS

| KR | 20000065673 | 11/2000 |
| KR | 20030017953 | 3/2003 |
| KR | 1020050106435 A | 11/2005 |
| KR | 1020060012928 | 2/2006 |
| WO | 2007092887 A2 | 8/2007 |

OTHER PUBLICATIONS

R2-071875 3GPP TSG-RAN WG2 Meeting #58, "Introduction of Improved L2 support for high data rates and Enhanced CELL_FACH state", May 2007.

(Continued)

*Primary Examiner* — Salman Ahmed
*Assistant Examiner* — Tarell Hampton
(74) *Attorney, Agent, or Firm* — Klein, O'Neill & Singh, LLP

(57) ABSTRACT

A method of delivering packet data units (PDUs) for a user equipment in a wireless communications system includes receiving a reordering PDU having at least one upper layer PDU from a protocol entity, determining whether the at least one upper layer PDU are segmented for reassembling with a previously stored segment of a upper layer PDU according to a segmentation indication message corresponding to the reordering PDU, and delivering the at least one PDU to an upper layer protocol entity and discarding the previously stored segment when the at least one upper layer PDU are all not segmented PDUs.

10 Claims, 4 Drawing Sheets

OTHER PUBLICATIONS

Samsung:"L2 header optimization for HSPA+", Mar. 26-30, 2007, 3GPP TSG-RAN 2 Meeting #57bis, Tdoc R2-071140, XP050134116, St. Julians, Malta.

Ericsson:"L2 enhancements CR to MAC", Feb 12-16, 2007, 3GPP TSG-RAN2 Meeting #57, R2-070810, XP050133835, St. Louis, USA.

Nokia Corporation, Nokia Siemens Networks:"Enhanced Uplink for CELL_FACH in 25.321", Mar. 31 to Apr. 4, 2008, 3GPP TSG-RAN WG2 Meeting #61, R2-081774, XP056139480, Shenzhen, China.

3GPP TS 25.308 V7.3.0, 3rd Generation Partnership Project; Technical Specification Group Radio Access Network; High Speed Downlink Packet Access (HSDPA); Overall description; Stage 2 (Release 7), Jun. 2007.

\* cited by examiner

METHOD AND APPARATUS OF DELIVERING PROTOCOL DATA UNITS FOR A USER EQUIPMENT IN A WIRELESS COMMUNICATIONS SYSTEM

CROSS REFERENCE TO RELATED APPLICATIONS

This application claims the benefit of U.S. Provisional Application No. 60/916,546, filed on May 7, 2007 and entitled "Method and Apparatus for allocating HARQ configuration and concatenation and delivery of MAC PDUs", the contents of which are incorporated herein by reference.

BACKGROUND OF THE INVENTION

1. Field of the Invention

The present invention relates to a method and apparatus for delivering protocol data units in a user equipment of a wireless communications system, and more particularly to a method and apparatus for delivering protocol data units by properly discarding previously stored segments of protocol data units in a user equipment of a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

In the prior art, lengths of all Protocol Data Units (PDUs) outputted from a Radio Link Control (RLC) layer are the same. However, this decreases bandwidth utility rate and data processing efficiency, especially for high data rate applications, such as High Speed Downlink Package Access (HSDPA) and High Speed Uplink Package Access (HSUPA) in the 3G mobile telecommunications system. Thus, targeting high data rate applications, the 3rd Generation Partnership Project (3GPP) makes some modifications for RLC and Media Access Control (MAC) layers, which primarily includes adopting flexible RLC PDU sizes and providing PDU segmentation/reassembly in the MAC layer, to enhance bandwidth utility rate and data processing efficiency, thereby making high data rate enabled by physical layer features such as Multi-input Multi-output (MIMO) and high order modulations possible.

In such a situation, the 3GPP newly introduces a MAC-ehs protocol entity in the MAC layer, which allows the support of flexible RLC PDU sizes as well as MAC segmentation/reassembly. Furthermore, unlike MAC-hs for HSDPA, MAC-ehs allows multiplexing of data from several priority queues within one transmission time interval (TTI) of 2 ms. Detailed operations of the MAC-ehs entity can be found in the MAC protocol specification formulated by the 3GPP, and are not narrated herein.

Please refer to FIG. 1, which illustrates a schematic diagram of a MAC-ehs PDU. The MAC-ehs PDU consists of a plurality of reordering PDUs $R\_PDU_n$ and a corresponding MAC-ehs header. Each reordering PDU consists of at least one consecutive MAC-ehs Serving Data Unit (SDUs) or segments of MAC-ehs SDUs belonging to the same priority queue, or reordering queue. A MAC-ehs SDU, i.e. an upper layer PDU, is either a MAC-c PDU or a MAC-d PDU. For each reordering PDU, the MAC-ehs header carries a Logical channel identifier (LCH-ID) field $LCH\text{-}ID_n$, a Length field $L_n$, a Transmission Sequence Number (TSN) field $TSN_n$, a Segmentation Indication (SI) field $SI_n$, and a header extension field $F_n$. The LCH-ID field $LCH\text{-}ID_n$ indicates a priority queue for each reordering PDU, wherein the mapping between the logic channel and the priority/reordering queue is provided by upper layers. The Length field $L_n$ indicates data length of each reordering PDU. The TSN field $TSN_n$ indicates a TSN of each reordering PDU for reordering purpose. The SI field $SI_n$ indicates whether MAC-ehs SDUs included in each reordering PDU are segmented and segmentation type of the reordering PDU for reassembly. The header extension field $F_n$ then indicates whether there exists a next reordering PDU in the following.

Thus, when a MAC-ehs PDU is received by the UE, each reordering PDU is firstly assigned to a corresponding reordering queue for reordering according to the LCH-ID field $LCH\text{-}ID_n$ and the TSN field $TSN_n$. In each reordering queue, if the latest received reordering PDU is determined to be consecutive to a previously stored segment of a MAC-ehs SDU, the reordering PDU shall be further concatenated with the previously stored segment of the MAC-ehs SDU according to the SI field $SI_n$, so that a complete MAC-ehs SDU can be delivered to upper layers.

According to the above MAC protocol, the SI field is indicated by two bits, and thus includes four segmentation types:

1) Type '00': indicates that a first MAC-ehs SDU and a last MAC-ehs SDU in a reordering PDU are not segmented.

2) Type '01': indicates that a first MAC-ehs SDU in a reordering PDU is a front-end segmented upper layer PDU; and, if there are more than one MAC-ehs SDUs in the reordering PDU, a last MAC-ehs SDU in the reordering PDU is not segmented.

3) Type '10': indicates that a last MAC-ehs SDU in a reordering PDU is a back-end segmented upper layer PDU; and, if there are more than one MAC-ehs SDUs in the reordering PDU, a first MAC-ehs SDU in the reordering PDU is not segmented.

4) Type '11': indicates that a first MAC-ehs SDU in a reordering PDU is a front-end segmented upper layer PDU; and, a last MAC-ehs SDU in the reordering PDU is a back-end segmented upper layer PDU.

In the prior art, when a reordering PDU with the SI field='00' is received, since MAC-ehs SDUs included in the reordering PDU have not been segmented, all complete upper layer PDUs in the reordering PDU shall be directly delivered to upper layers, such as to corresponding logic channels, and concatenation with the previously stored segment of MAC-ehs SDU is not performed. However, if the previous stored PDU segment is not discarded, a wrong upper layer PDU may be generated and delivered due to incorrect concatenation.

For example, when a reordering PDU with TSN=2 and the SI field='00' is received, as mentioned above, all complete upper layer PDUs in the reordering PDU shall be directly delivered to corresponding logic channels without performing any concatenation. In this case, if SI fields of following received reordering PDUs are all equal to '00', the previous stored PDU segment would not be discarded or concatenated. At this time, if a reordering PDU with TSN=2 of a next cycle and the SI field='01' or '11' is received, the reordering PDU would be determined to be consecutive with the previously stored PDU segment according to the TSN, and may concatenate with the previously stored PDU segment, so as to generate an incorrect upper layer PDU.

In short, since the previously stored PDU segment is not discarded appropriately, the following received reordering PDU may be concatenated with the previously stored PDU segment in some situations, resulting in a data error of the UE.

SUMMARY OF THE INVENTION

It is therefore an objective of the present invention to provide a method and apparatus for delivering protocol data units in a user equipment of a wireless communications system.

According to the present invention, a method for delivering protocol data units, named PDUs hereinafter, in a user equipment of a wireless communications system is disclosed. The method includes steps of receiving a reordering PDU having at least one PDU from a protocol entity; determining whether the at least one PDU are segmented for reassembling with a previously stored PDU segment according to a segmentation indication message corresponding to the reordering PDU; and delivering the at least one PDU to an upper layer protocol entity of the protocol entity and discarding the previously stored PDU segment when the at least one PDU are all not segmented.

According to the present invention, a communications device used in a wireless communications system for delivering protocol data units, named PDUs hereinafter, is further disclosed. The communications device includes a control circuit for realizing functions of the communications device; a processor installed in the control circuit, for executing a program code to command the control circuit; and a memory installed in the control circuit and coupled to the processor for storing the program code. The program code includes steps of receiving a reordering PDU having at least one PDU from a protocol entity; determining whether the at least one PDU are segmented for reassembling with a previously stored PDU segment according to a segmentation indication message corresponding to the reordering PDU; and delivering the at least one PDU to an upper layer protocol entity of the protocol entity and discarding the previously stored PDU segment when the at least one PDU are all not segmented.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
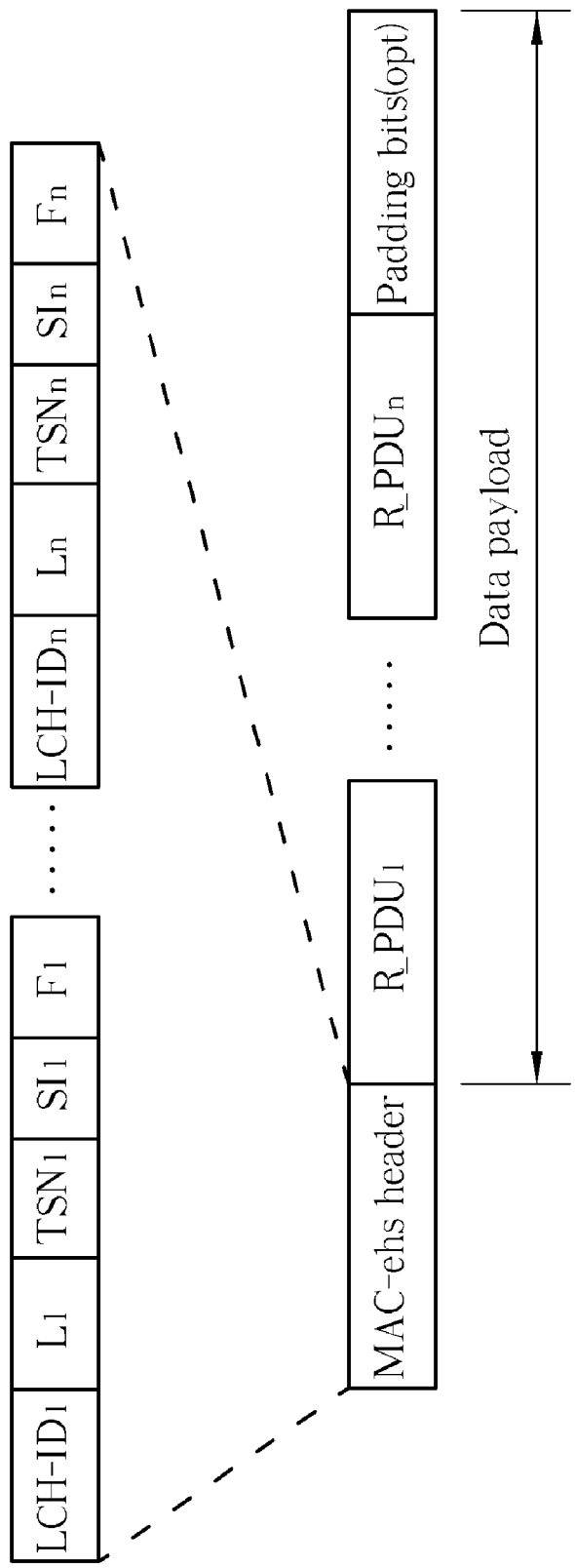
FIG. 1 illustrates a schematic diagram of a MAC-ehs PDU.
Figure 2:
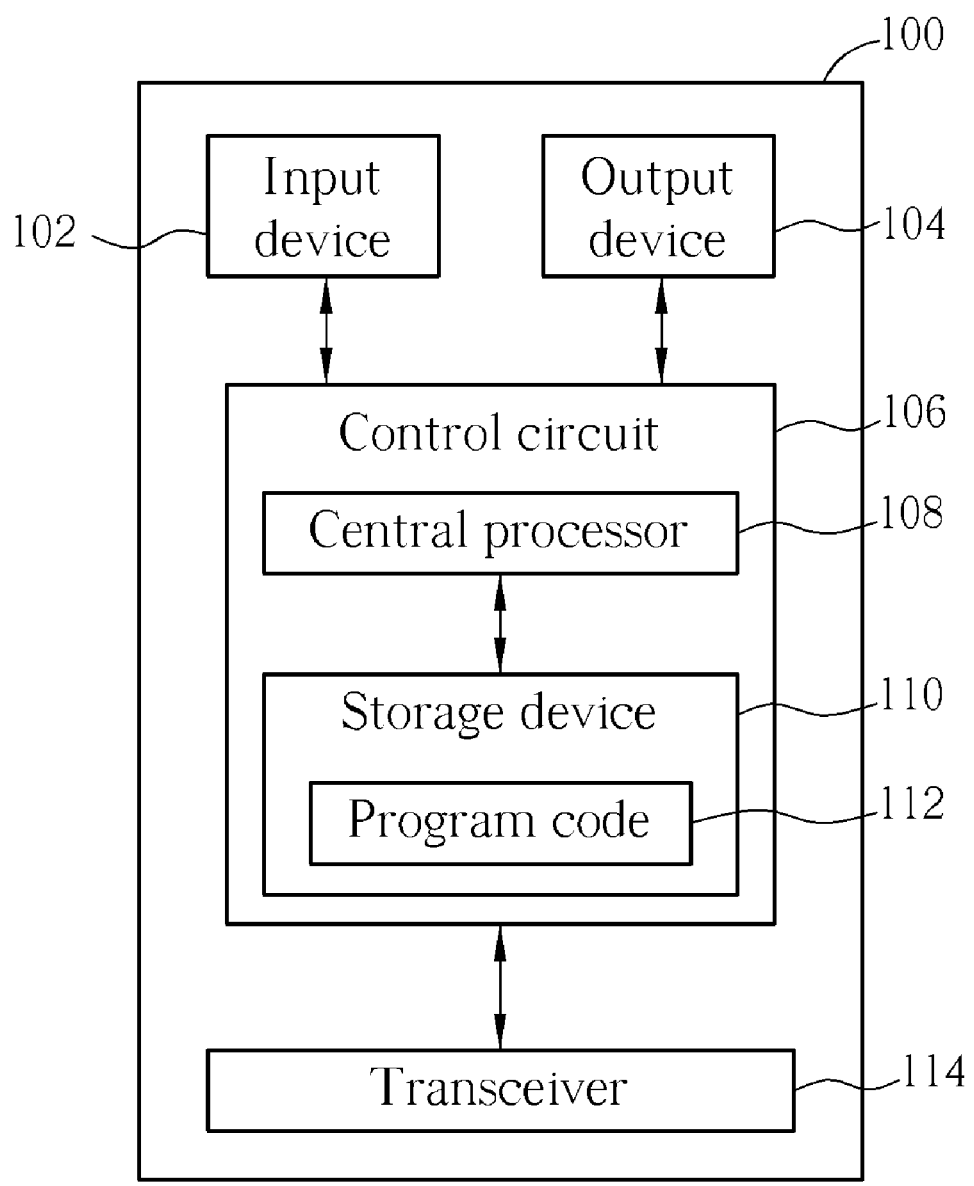
FIG. 2 is a functional block diagram of a communications device.

Please refer to FIG. 2, which is a functional block diagram of a communications device 100. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
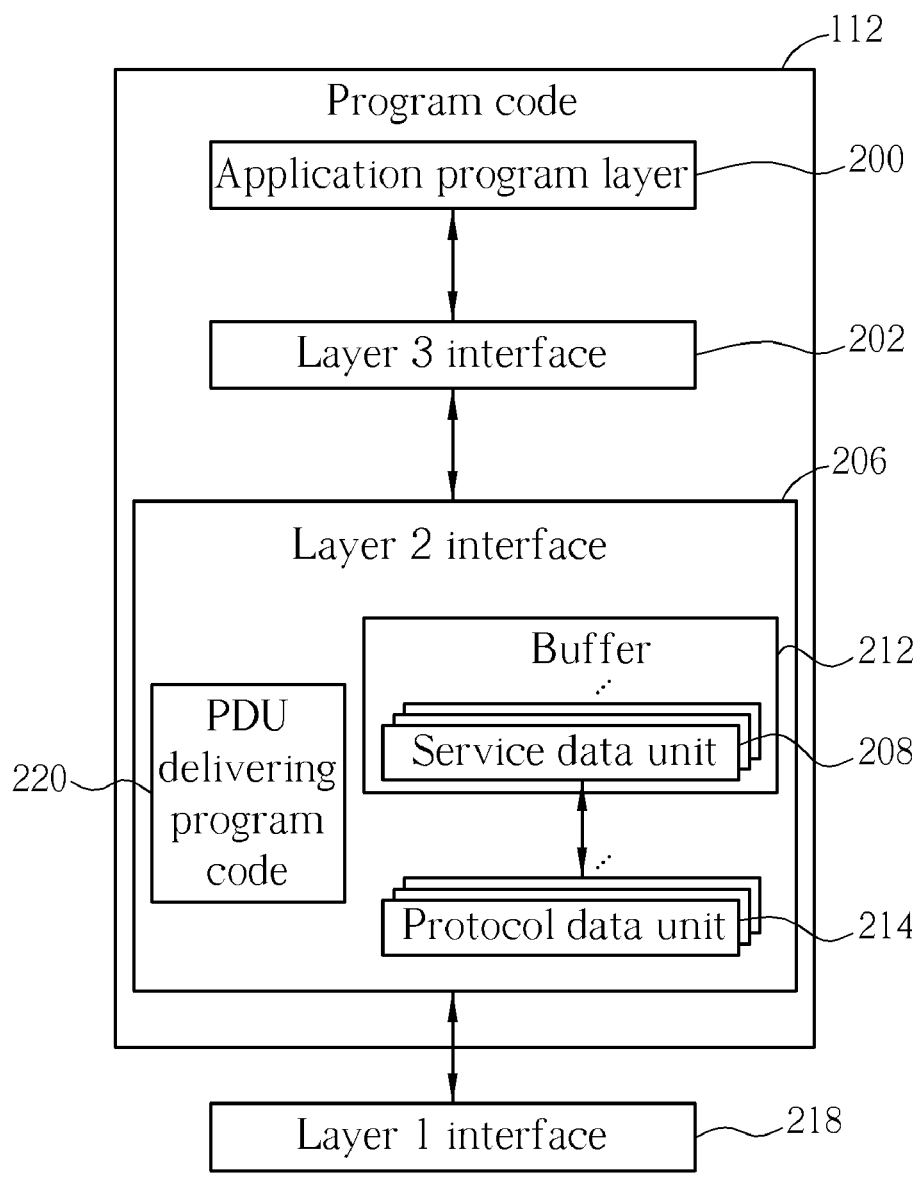
FIG. 3 is a schematic diagram of the program code in FIG. 2.

Please further refer to FIG. 3, which is a schematic diagram of the program code 112 in FIG. 2. The program code 112 comprises an application program layer 200, a layer 3 interface 202, a layer 2 interface 206, and a layer 1 interface 218. When transmitting signals, the layer 3 interface 202 submits Service Data Units (SDUs) 208 to the layer 2 interface 206 and the layer 2 interface 206 stores the SDUs 208 in a buffer 212. Then, the layer 2 interface 206 generates a plurality of PDUs 214 according to the SDUs 208 stored in the buffer 212 and outputs the PDUs 214 generated to a destination through the layer 1 interface 218. Conversely, when receiving a radio signal, the radio signal is received through the layer 1 interface 218 and the layer 1 interface 218 outputs PDUs 214 to the layer 2 interface 206. The layer 2 interface 206 restores the PDUs 214 to SDUs 208 and stores the SDUs 208 in the buffer 212. Finally, the layer 2 interface 206 transmits the SDUs 208 stored in the buffer 212 to the layer 3 interface 202. Preferably, the communications device 100 is applied in an Evolved High Speed Packet Access (Evolved HSPA) system, such that the layer 2 interface 206 can be a MAC-ehs interface utilized for handling MAC-ehs PDUs.

Figure 4:
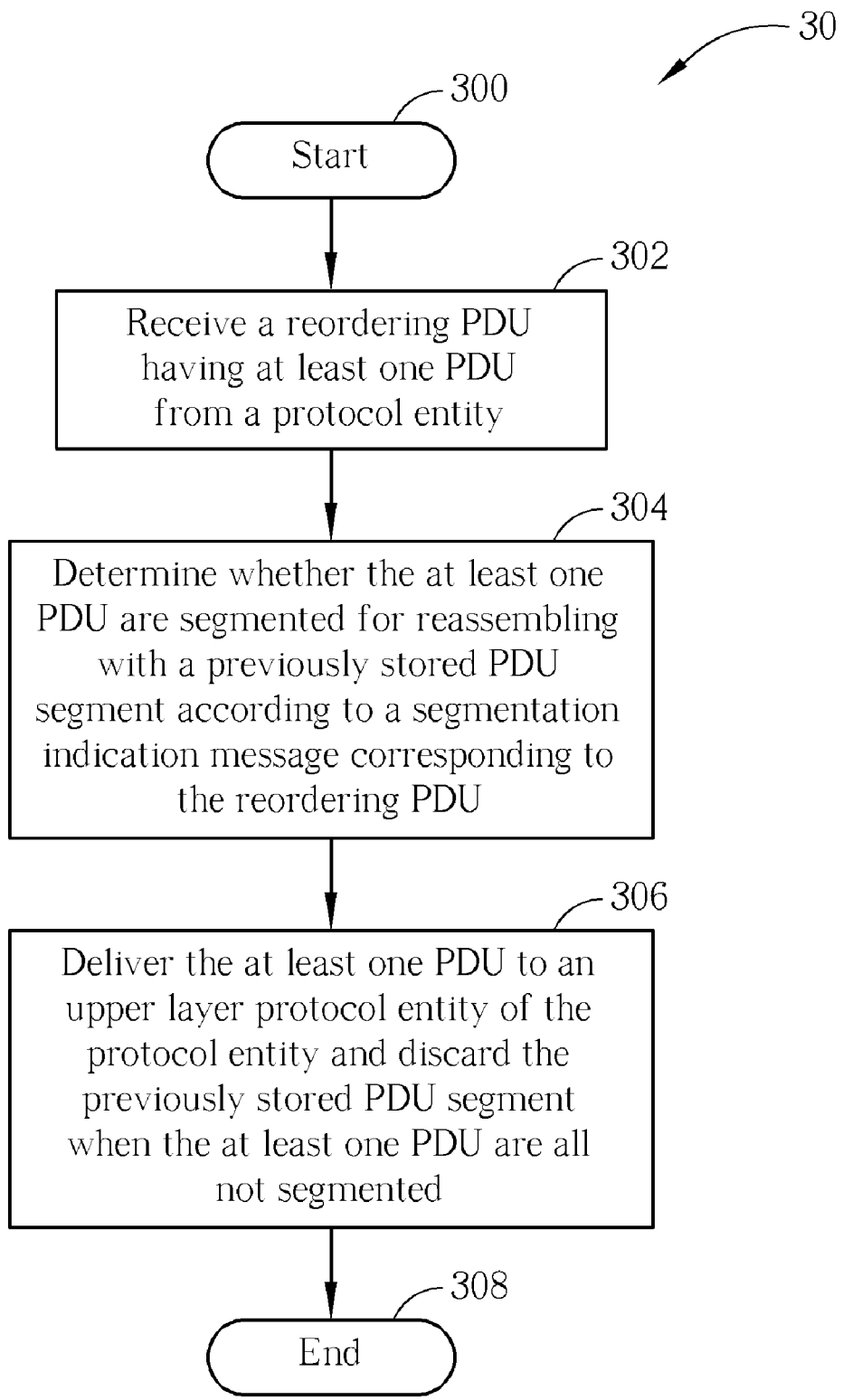
FIG. 4 is a schematic diagram of a process according to an embodiment of the present invention.

When a MAC-ehs PDU is received by the communications device 100, each reordering PDU in the MAC-ehs PDU is firstly assigned to a corresponding reordering queue for reordering and reassembly. In this case, the embodiment of the present invention provides a PDU delivering program code 220 in the program code 112 utilized for correctly delivering PDUs to upper layers. Please refer to FIG. 4, which illustrates a schematic diagram of a process 30 according to an embodiment of the present invention. The process 30 is utilized for delivering PDUs in a user equipment of a wireless communications system, and can be compiled into the PDU delivering program code 220. The process 30 includes the following steps:

Step 300: Start.

Step 302: Receive a reordering PDU having at least one PDU from a protocol entity.

Step 304: Determine whether the at least one PDU are segmented for reassembling with a previously stored PDU segment according to a segmentation indication message corresponding to the reordering PDU.

Step 306: Deliver the at least one PDU to an upper layer protocol entity of the protocol entity and discard the previously stored PDU segment when the at least one PDU are all not segmented.

Step 308: End.

According to the process 30, a reordering PDU is firstly received in a reordering queue. The reordering PDU is carried in a MAC-ehs PDU and includes at least one upper layer PDU. Then, it is determined whether the at least one PDU are segmented for reassembling with a previously stored PDU segment according to a segmentation indication message corresponding to the reordering PDU. The segmentation indication message is a Segmentation Indication (SI) field corresponding to the reordering PDU in the MAC-ehs PDU. When the at least one PDU are all not segmented, the at least one PDU are delivered to an upper layer protocol entity of the protocol entity, and the previously stored PDU segment is discarded.

In other words, when a reordering PDU with the SI field='00' is received, not only are all complete upper layer PDUs in the reordering PDU directly delivered to upper layers, such as to corresponding logic channels, but the previously stored PDU segment is also discarded in the embodiment of the present invention, so as to prevent incorrect concatenation of later-received reordering PDUs with the previously stored PDU segment.

As mentioned above, when the reordering PDU with all complete upper layer PDUs is received, the embodiment of the present invention further discards the previously stored PDU segment to avoid incorrect PDU concatenation and delivery that causes a data error of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for delivering protocol data units, named PDUs thereinafter, in a user equipment of a wireless communications system, the method comprising:
   receiving a reordering PDU having set of MAC-ehs serving data units, named MAC-ehs SDUs;
   delivering the reordering PDU to an upper layer when a first MAC-ehs SDU of the set of MAC-ehs SDUs and a last MAC-ehs SDU of the set of MAC-chs SDUs are not segmented according to a segmentation indication field corresponding to the reordering PDU; and
   discarding any previously stored MAC-ehs SDU segment.

2. The method of claim 1. wherein the reordering PDU is carried in a MAC-ehs PDU.

3. The method of claim 2, wherein the segmentation indication field is a header field of the MAC-ehs PDU corresponding to the reordering PDU.

4. The method of claim 1, wherein the MAC-ehs SDUs comprise MAC-d PDUs or MAC-c PDUs.

5. The method of claim 1. wherein the wireless communications system is an Evolved High Speed Packet Access system.

6. A communications device used in a wireless communications system for delivering protocol data units, named PDUs hereinafterthe communications device comprising:
   a control circuit for realizing functions of the communications device;
   a central processing unit coupled to the control circuit for executing a program code to operate the control circuit; and
   a memory coupled to the central processing unit or storing the program code;
   wherein the program code comprises:
      receiving a reordering PDU having set of MAC-ehs serving data units, named MAC-ehs SDUs;
      delivering the reordering PDU to an upper layer when a first MAC-chs SDU of the set of MAC-ehs SDUs and a last MAC-ehs SDU of the set of MAC-ehs SDUs are not segmented according to a segmentation indication field corresponding to the reordering PDU; and
      discarding any previously stored MAC-ehs SDU segment.

7. The communications device of claim 6. wherein the reordering PDU is carried in a MAC-ehs PDU.

8. The communications device of claim 7, wherein the segmentation indication field is a header field of the MAC-ehs PDU corresponding to the reordering PDU.

9. The communications device of claim 6. wherein the MAC-ehs SDUs comprise MAC-d PDUs or MAC-c PDUs.

10. The communication device of claim 6, wherein the wireless communications system is an Evolved High Speed Packet Access system.

* * * * *

UNITED STATES PATENT AND TRADEMARK OFFICE
CERTIFICATE OF CORRECTION

PATENT NO. : 8,064,460 B2
APPLICATION NO. : 12/116207
DATED : November 22, 2011
INVENTOR(S) : Li-Chih Tseng It is certified that error appears in the above-identified patent and that said Letters Patent is hereby corrected as shown below:

In the Claims

Column 6, Line (22):
Delete "MAC-chs" and insert -- MAC-ehs --.

Signed and Sealed this
Sixth Day of September, 2022

Katherine Kelly Vidal
*Director of the United States Patent and Trademark Office*